March 1, 1955 — E. M. BOAT — 2,702,946
DIAL BORE GAUGE
Filed Jan. 24, 1951
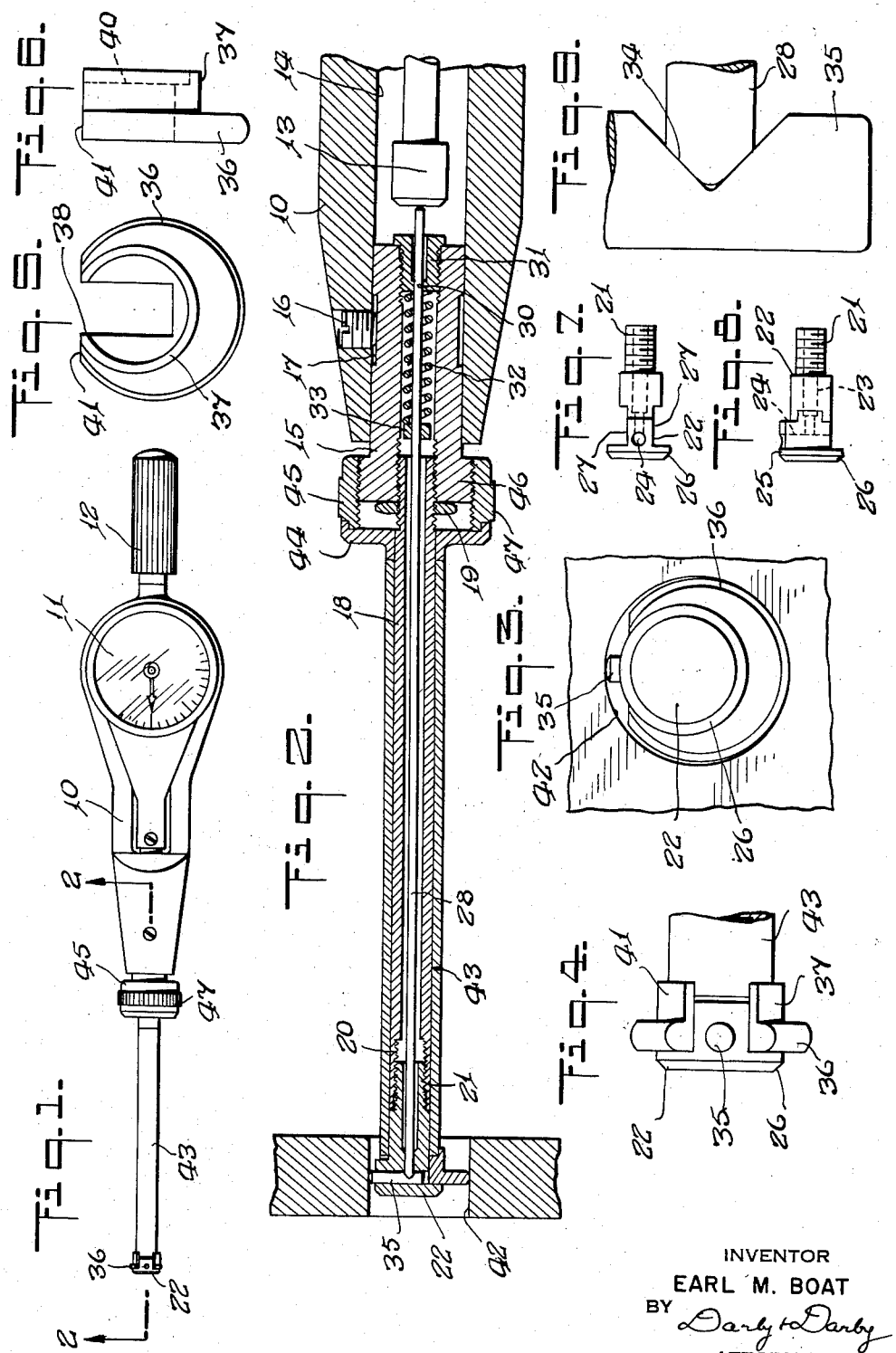
INVENTOR
EARL M. BOAT
BY Darby & Darby
ATTORNEYS United States Patent Office 2,702,946
Patented Mar. 1, 1955

2,702,946

DIAL BORE GAUGE

Earl M. Boat, Poughkeepsie, N. Y., assignor to Standard Gage Company, Inc., Poughkeepsie, N. Y., a corporation of New York Application January 24, 1951, Serial No. 207,588

8 Claims. (Cl. 33—178)

The present invention relates to dial bore gages and particularly to a dial bore gage adapted to the measurement of small bores such for example as bores up to 3/8" in diameter.

More particularly the invention comprises a dial bore gage in which the measuring head is adapted to the measurement of bores of a single diameter with specified tolerance, the gage, however, being so constructed that by a readily accomplished replacement of a size disk the gage can be adapted to the measurement of bores of another diameter with a different predetermined tolerance.

In the past dial bore gages have been manufactured which were suitable for measuring relatively small bores, but these gages had relatively low accuracy and the range thereof was necessarily small. Some of the prior gages of the type mentioned were provided with centralizing plungers and the measurement was taken on a diameter of the bore by means of the measuring plungers and a button located diametrically opposite thereto. Ordinarily the measuring button mentioned was screw-threadedly inserted into the gaging head and could be changed in order to modify the range of measurement of the instrument.

The present invention substitutes a size disk for the centralizing plungers and the measuring button and thereby eliminates the complex mechanical arrangements required to properly operate the centralizing plungers and at the same time eliminates the necessity for the screw-threaded button and provides for range extension by merely exchanging one size disk for another.

It is an object of the invention to provide a dial bore gage for measuring specific bores which is readily adapted to the measurement of other specific bores within the range of measurement of the gage.

It is another object of the invention to provide a dial bore gage capable of measuring extremely small bores without utilizing the centralizing plungers which have heretofore been commonly used and which have made such small bore gages extremely hard to produce in quantity because of the relatively small space available for the leverage and spring arrangements essential to the proper operation of such centralizing plungers.

It is a further object of the invention to provide a measuring head for a dial bore gage so constructed that the measuring plunger is held within the head by the measurement transmitting rod thereby eliminating the use of a separate setscrew or other means for retaining the plunger in the head.

It is another object of the invention to provide a size disk for the measuring head of a dial bore indicator so constructed as to prevent the measuring plunger from being depressed by the wall of a bore to so great an extent as to force the indicator to or beyond the limits of its travel thereby assuring that even though the dial indicator utilized has a relatively small range, nonetheless the parts cannot be jammed and the dial indicator gage damaged.

Other objects and features of the invention will be apparent when the following description is considered in connection with the annexed drawings, in which, Figure 1 is a top plan view of the dial bore gage of my invention;

Figure 2 is a cross-sectional view of the measuring head of a dial bore gage, the view being taken on the plane of line 2—2 of Figure 1;

Figure 3 is an enlarged front elevation of the measuring head of the device showing particularly the shape of the size disk and position of the measuring plunger in relation to the hole being measured;

The apparent difference of diameters of the disk and bore has of course been exaggerated in the drawing. Actually the disk diameter would be only approximately .001 inch less than the minimum acceptable bore diameter. Therefore the edges of the top flatted areas of the disk are effective in limiting the inward movement of the measuring plunger when contacting the wall of a bore.

Figure 4 is a top plan view showing the size disk assembled between the plunger block and the locking sleeve;

Figure 5 is an elevational view of a size disk removed from the gaging head and illustrating particularly the mode of construction thereof to adapt it for ready removal and replacement upon the measuring head;

Figure 6 is a side elevation of the size disk of Figure 5;

Figure 7 is a top plan view of the plunger block of Figure 2;

Figure 8 is a side elevational view of the plunger block of Figure 7; and

Figure 9 is an enlarged fragmentary view of the measuring plunger and the motion transmitting rod showing the cooperation therebetween and the mode of assuring that the measuring plunger be held within the gage head by the motion transmitting rod without any other retaining means.

Referring now to the drawings, there is shown at 10 a housing member in which there is fitted a dial indicator 11 of the type frequently known as a universal midget dial indicator. A handle 12 is either rigidly fixed to the housing 10 or is made integral therewith.

Referring now particularly to Figure 2 it will be seen that the measuring plunger 13 of the dial indicator 11 extends into a central bore 14 in the housing 10, being freely movable in the bore. Adjustably fixed in the bore 14 is a sleeve 15 which sleeve is held in position by means of the setscrew 16 which extends through the wall of the bore and bears against a groove 17 in the sleeve 15. At its left hand end sleeve 15 is internally threaded. Screwed into sleeve 15 is a second sleeve 18 which is locked into an adjusted position by means of lock nut 19.

The sleeve 18 is also provided with an internal screw thread 20 at its left hand end into which screws a reduced cylindrical portion 21 of a plunger block 22. The plunger block 22 is shown particularly in Figure 8 and is provided with a bore 23 extending horizontally therethrough and intersecting a bore 24 which extends vertically thereof. Also the block 22 is provided with a cylindrical portion 25 concentric with the bore 23 which cylindrical portion is provided with a chamfered edge 26 for clearance when rocking the gage in a bore to be measured.

Also, as is seen in Figure 7, the plunger block 22 is provided with flat grooves 27 on opposite vertical sides thereof, these flatted areas serving for mounting the size disks which will be hereinafter described.

Extending freely through the internal bore of the sleeve 18 and through the bore of the sleeve 15 is a movement transmitting rod 28 which is guided at its left hand end by a sliding fit in a reduced portion of the bore 23 of block 22 and is guided at its right hand end by a sliding fit within a bore 30 in a bushing 31 which is screwed into the right hand end of sleeve 15.

The rod 28 is urged toward the left by means of a compression spring 32 which extends between the inner surface of the bushing 31 and a collar 33 fixed to the rod 28.

Rod 28 terminates at its left hand end in a wedge point as indicated at 34, Figure 9. The point 34 is preferably formed with an included angle of 90° (45° with the center line), slightly rounded at its apex and extends into a similar cut in the measuring plunger 35, thereby assuring that any movement of the measuring plunger will be transmitted through the rod 28 and the plunger 13 to the dial indicator 11 and likewise preventing rotation of the plunger 35 and assuring the retention of the plunger 35 in the bore 24 of the block 22.

Size disks are provided to centralize the gaging head within a bore and at the same time cooperate with the measuring plunger 35 to yield a measurement of a diameter of the bore. These size disks comprise a cylindrical portion 36, Figure 5, which cylindrical portion is eccentric as respects a longitudinally extending cylindrical rim 37. In addition, each size disk is provided with a rectangular cutout 38 which cutout is adapted to fit over the rectangular portion 27 of the plunger block.

As will be seen particularly by reference to Figure 6, the portion 37 is recessed as indicated at 40 to form the rim mentioned above and the outer surface of the disk portion 36 is ground and lapped to a radius so that the gaging head may be readily rocked in the bore in order to procure the proper reading of bore diameter.

As seen particularly in Figure 3, the eccentric portion 36, i. e., the portion which is eccentric as respects the gage axis serves to center the gaging head or block 22 in the bore indicated at 42 and at the same time the point of the disk 36 directly opposite the measuring plunger 35 cooperates with that plunger to determine the diameter of the bore measured.

The rim portion 37 of the size disk is provided in order to hold the disk firmly in place on the block 22 and to render it possible to readily and quickly remove a particular size disk and replace it with another. The rim 37 cooperates with an outer sleeve 43, which sleeve is a sliding fit on sleeve 18. Mounted on the right hand end of sleeve 18 is a flanged disk 44 which abuts the right hand edge of sleeve 43. Cooperating with the disk 44 is an internally threaded cylindrical member 45 which is threaded on the enlarged left hand portion 46 of the sleeve 15. It will be seen that by rotating the cylinder 45 (which is provided with a knurled surface at 47) in one direction the cylinder 45 is caused to move away from the disk 44 thereby making it possible to slide the sleeve 43 to the right thus removing the end of the sleeve from within the rim 37. When the sleeve 43 is so moved to the right the size disk may be removed from the block 22, a new size disk placed in position and the sleeve 43 then moved to the left to lock the new disk in position. The sleeve 43 is then retained in its left hand position by rotating the cylinder 45 in the opposite direction causing the flanged disk 44 to move into abutting relation with the right hand end of the sleeve and lock it in that position.

Thus it will be seen that I have provided a gaging head so constructed that a plurality of different fixed-size disks may be readily mounted on the gaging head and interchanged one for the other with great facility. At the same time the construction is extremely simple and the parts may be readily and economically manufactured.

What is claimed is:

1. In a dial bore gage adapted to the measurement of small bores, in combination, a housing mounting a dial indicator, a sleeve mounted on said housing and extending therefrom, a block mounted at the end of said sleeve remote from said housing, a measuring plunger mounted in said block for movement at right angles to the axis of said sleeve, a motion transmitting rod cooperating with said measuring plunger and the dial indicator to transmit movement from the measuring plunger to the dial indicator, a centering disk mounted on said block for cooperation with said measuring plunger to center said block and plunger within the bore and to cooperate with said plunger to measure the bore diameter, said centering disk having a convexly curved peripheral edge, the maximum diameter of the disk lying substantially in the plane of the axis of said measuring plunger, and means comprising a second sleeve slidably mounted on said first mentioned sleeve for retaining said disk in position on said block.

2. A device as claimed in claim 1 characterized in that said centering disk is provided with a rim, said rim cooperating with said second sleeve to retain the centering disk in position, said rim being concentric with said sleeve.

3. A device as claimed in claim 1 characterized in that said second sleeve is movable longitudinally relative to said first sleeve and is provided with screw-threaded means for locking it in an adjusted position.

4. A device as claimed in claim 2 characterized in that said second sleeve in one of its extreme positions extends within the rim of the centering disk to hold the latter in position on said block.

5. A device as claimed in claim 1 characterized in that said centering disk when in position is eccentric as respects the axis of said first and second sleeves.

6. A device as claimed in claim 1 characterized in that said centering disk has a segment removed therefrom adjacent said measuring plunger to form a flat upper section.

7. A device as claimed in claim 1 characterized in that said measuring plunger is provided with a wedge-shaped 90° notch therein and said motion transmitting rod is provided with a wedge-shaped point having an included angle of 90° which point fits within the notch of said measuring plunger to thereby retain said measuring plunger in position in said block and to transmit movement of said measuring plunger to said motion-transmitting rod.

8. In a dial bore gage of the type having a dial indicator mounted in a housing and adapted to be operated by a measuring plunger mounted in a gaging head supported at a distance from the housing, in combination, a size disk adapted to be mounted on the gaging head to cooperate with the measuring plunger, said size disk being of predetermined size and being adapted to be mounted with its axis eccentric to the axis of the gaging head, a rim extending outwardly from said size disk, said rim being generally circular and concentric to the axis of the gaging head, a portion of said rim being omitted to permit mounting of the disk on said gaging head, and means for holding said size disk in its position on said gaging head, said means comprising a sleeve adapted to fit within said rim and to be locked in position therein.

References Cited in the file of this patent

UNITED STATES PATENTS

| 1,186,075 | Bryant | June 6, 1916 |
| 1,721,600 | Leschen | July 23, 1929 |
| 1,808,816 | Johnson | June 9, 1931 |
| 2,385,157 | Nilsson et al. | Sept. 18, 1945 |
| 2,424,497 | Nilsson | July 22, 1947 |
| 2,474,320 | Pelan | June 28, 1949 |

FOREIGN PATENTS

| 556,532 | Great Britain | Oct. 8, 1943 |
| 228,853 | Switzerland | Dec. 16, 1943 |
| 234,297 | Switzerland | Dec. 16, 1944 |

OTHER REFERENCES

Betz publication, American Machinist, April 1933. Copy in Library.